Sept. 25, 1945.    H. LEHDE    2,385,454
APPARATUS FOR AUTOMATICALLY ADJUSTING ELECTRICAL NETWORKS
Filed July 17, 1941
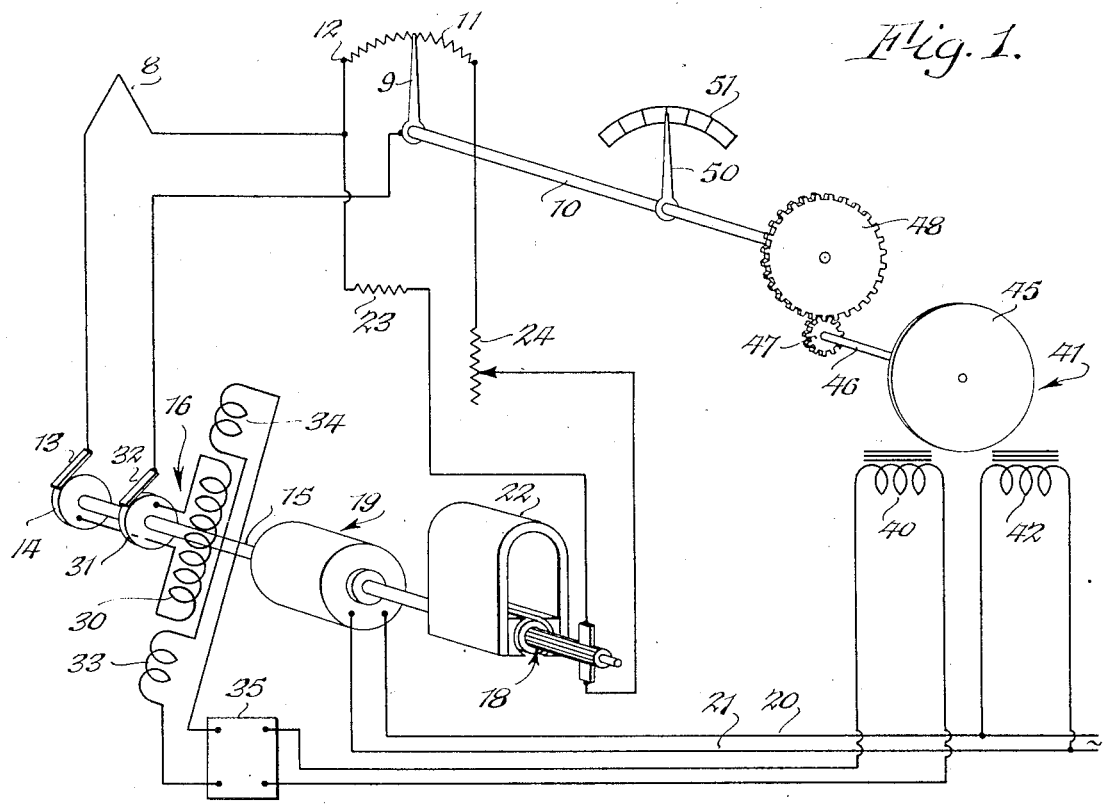
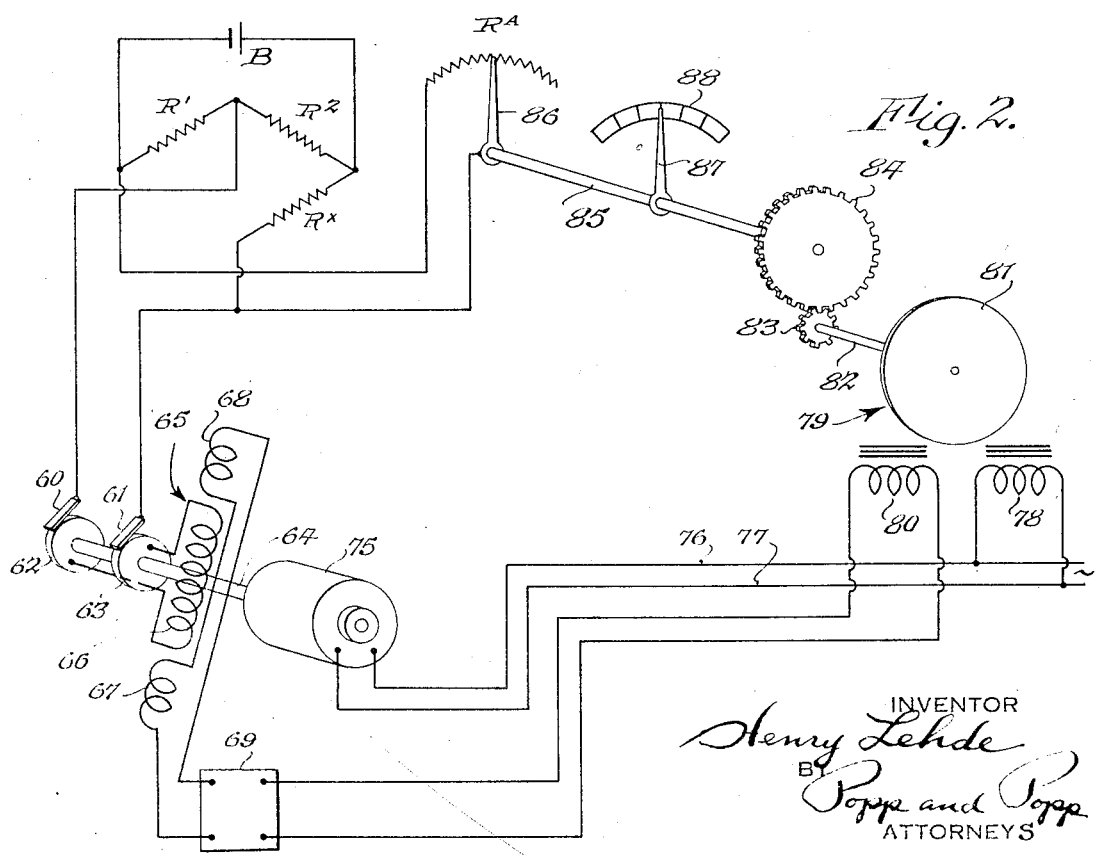
INVENTOR
Henry Lehde
BY Popp and Popp
ATTORNEYS Patented Sept. 25, 1945

2,385,454

UNITED STATES PATENT OFFICE 2,385,454

APPARATUS FOR AUTOMATICALLY ADJUSTING ELECTRICAL NETWORKS

Henry Lehde, Brooklyn, N. Y., assignor to The Brown Instrument Company, Philadelphia, Pa., a corporation of Pennsylvania Application July 17, 1941, Serial No. 402,802

4 Claims. (Cl. 172—239)

This invention relates to apparatus for automatically balancing or adjusting electrical networks. The invention can be used to balance any direct current circuit or network where the direction or sign of a small voltage unbalance is an indication of the direction of the adjustment to be made. In this capacity it is particularly useful in potentiometer arrangements employing thermocouples to indicate, record or control temperatures, or for the measurement or control of any effect that can be associated with or produce direct current voltages.

It is the primary object of this invention to provide a very inexpensive, simple and rugged apparatus for automatically operating or balancing a direct current potentiometer, or other network, where the presence of a small voltage unbalance is utilized to control the apparatus. While various forms of automatic potentiometers are known, it has heretofore been necessary to employ a galvanometer or similar expensive and delicate instrument to control the motor or other means which automatically balances the potentiometer. The present invention retains the sensitivity and accuracy of galvanometer control, but is comparatively much more rugged in construction and stable in operation.

Another object is to provide such apparatus which is not affected by positioning or by moderate amounts of shock.

Another object is to provide such apparatus which is of simple and compact construction thereby to permit the apparatus to be made in portable form.

A further important object is to provide a simple and inexpensive means for supplying the unvarying direct current required in the slide wire of a potentiometer. This has previously been a serious drawback to the use of potentiometer arrangements, requiring both the maintenance of a battery for supplying the current, and a standard cell or other means for periodically checking its value.

The invention will be described with reference to a potentiometer circuit for measuring direct current voltages, and also with reference to the conventional Wheatstone bridge for resistance measurements. Its adaptation to the adjustment of similar networks will be obvious.

In the accompanying drawing:

Fig. 1 is a diagrammatic representation of a circuit embodying the invention as applied to the usual potentiometer arrangement for measuring the voltage generated by a thermocouple.

Fig. 2 is a similar view illustrating the embodiment of the invention in a circuit including a Wheatstone bridge.

In the form of the invention shown in Fig. 1, a thermocouple 8 is shown as arranged in a potentiometer circuit. The numeral 9 represents a contact arm fast to a shaft 10 and traversing a slide wire resistance 11, one terminal 12 of which is connected with the thermocouple 8. The thermocouple 8 is also connected to a brush 13 engaging a slip ring 14 fixed to the shaft 15 of a small alternator indicated generally at 16. Current is supplied to the slide wire 11 by a small direct current generator 18. This generator is driven by a synchronous motor 19 supplied with constant regulated current from power lines 20 and 21 and this generator has a permanent magnet field, provided by permanent magnets 22, instead of an electromagnetic field.

A ballast resistor 23 and an adjustable resistor 24 are connected in series with the slide wire resistance 11 and with the commutator of the direct current generator 18.

The alternator 16 includes a rotating field 30 one terminal of which is connected with the slip ring 14 and the other terminal of which is connected with another slip ring 31 fixed to the shaft 15. This second slip ring 31 is engaged by a brush 32 which is connected with the contact arm 9 traversing the slide wire resistance 11. The alternator 16 also includes stationary armature coils 33 and 34 which are connected in series and are connected with an amplifier 35. The amplified current from the amplifier 35 is led to one winding 40 of a two phase motor indicated generally at 41. The other winding 42 of this motor is permanently energized through connection with the main power lines 20 and 21. The motor 41 is preferably constructed generally as illustrated, including a conducting disk 45 fast to the motor shaft 46, the conducting disk being preferably made of aluminum to obtain a low inertia effect. This conducting disk is arranged in the adjoining magnetic fields of the two separately energized alternating current coils 40 and 42. A motor so constructed is very simple and inexpensive and also the motor will not run when one phase is deenergized as is the case with more efficient two phase motors. Thus, when the coil 40 is deenergized, the coil 42 acts as an electromagnetic brake to stop the disk 45 and prevent overshooting.

The shaft 46 of the two phase motor 41 is connected by a pair of gears 47 and 48 with the shaft 10 carrying the contact arm 9. This shaft 10 also carries a pointer 50 which indicates the voltage on an adjacent scale 51.

In operation, the voltage drop between the contact arm 9 and the terminal 12 of the slide wire resistance 11 opposes the voltage generated by the thermocouple 8. The current in the slide wire resistance 11 is furnished by the small direct current generator 18 driven by the synchronous motor 19.

Since the direct current generator 18 has a permanent magnet field and is driven at a constant speed when the synchronous motor 19 is supplied with constant regulated current from lines 20 and 21, the direct current generator 18 will deliver constant voltage to the ballast resistor 23, the adjustable resistor 24 and the slide wire resistance 11. The current delivered by the direct current generator 18 will also remain constant as long as the resistance in its circuit remains constant. The purpose of the ballast resistor 23 is to minimize the effect of fluctuation in the resistance of the generator 18 due to temperature changes. Thus temperature changes cause slight variation in the resistance of the generator 18, but as the value of the ballast resistor 23 is considerably higher than the resistance of the generator 18 and is composed of a material which is not materially affected by temperature changes, a slight variation of the resistance of the generator 18, due to temperature changes, does not cause an appreciable change in the total circuit resistance. The current in the slide wire resistance 11 is therefore maintained substantially constant, the exact value desired being obtained by a permanent adjustment of the adjustable resistor 24. No further calibration or adjustment is necessary to maintain the accuracy of the instrument.

Whenever an unbalance occurs in the voltage drop between the contact arm 9 and the terminal 12 of the slide wire resistance 11 and the thermocouple 8, current will flow through the rotating field 30 of the alternator 16. Since the alternator 16 is driven by the synchronous motor 19, the magnitude and phase of the alternating voltage generated in the stationary field coils 33 and 34 will depend upon the magnitude and direction of the current unbalance flowing through the rotating field 30 of the alternator 16. The output of the alternator 16 is amplified to any desired degree by the amplifier 35 and is then led to the winding 40 of the two phase motor 41. The other winding 42 of this motor is permanently energized by the same alternating current supply which drives the synchronous motor 19. The phase adjustment is such that the voltage delivered by the amplifier 35 to the motor 41 is 90° or 270° out of phase with the voltage supply, depending upon the direction of the current flowing through the alternator field 30.

By means of the gears 47, 48, the motor 41 can rotate the shaft 10 on which is mounted the contact arm 9 and the pointer 50. The phase of the current supplied by the amplifier 35 to the motor 41 determines the direction in which this motor turns. The connections are made so that the motor 41 will run in a direction to adjust the voltage drop across the slide wire resistance 11 to equal that of the thermocouple. The pointer 50 indicates the voltage on the adjacent scale 51.

The circuit may readily be adapted to any of the usual forms of apparatus for recording temperatures, or any other variables dependent on or associated with voltage. The recording element, which may be a pen or stylus, or some form of printing mechanism, can be controlled by the motor 41, while a moving chart driven by a constant speed motor or by clockwork, can be arranged in the usual way to furnish the time element.

In the event it is desirable for control or regulating purposes to drive auxiliary equipment from the shaft 10, it may be necessary to replace the motor 41 by another motor having more power. By means known in the art, the amplifier 35 can be connected to thyratron tube circuits to control a reversible motor of any desired size. Or a phase shift relay can be connected in place of motor 41 to control a reversible motor in any suitable manner.

It is important that no iron be used in the field structure of the alternator 16, or hysteresis effects will mask the true effect of the unbalance current in the field coil 30. The stationary armature coils 33 and 34 should also be shielded from the effects of any stray alternating fields.

A simplified form of the invention may be used for balancing a Wheatstone bridge, or similar direct current network, as shown in Fig. 2. The conventional Wheatstone bridge comprises the ratio resistances $R_1$ and $R_2$, the known resistance $R_A$ and the unknown $R_x$, connected to the battery B as shown. For convenience $R_1$ and $R_2$ are selected in values that are multiples of 10. The mid points of the bridge, instead of being connected to a galvanometer, are connected to the brushes 60 and 61 engaging slip rings 62 and 63, respectively, these slip rings being fast to the shaft 64 of an alternator indicated generally at 65. This alternator 65 is similar to the alternator 16, having a rotating field 66 one terminal of which is connected with the slip ring 62 and the other terminal of which is connected with the other slip ring 63, and the alternator 65 also having stationary armature coils 67 and 68 which are connected in series and are connected with an amplifier 69. The alternator 65 is driven by a synchronous motor 75 supplied with constant regulated current from power lines 76 and 77.

The amplified current from the amplifier 69 is led to one winding 80 of a two phase motor indicated generally at 79. The other winding 78 of this motor is permanently energized through connection with the main power lines 76, 77. The motor 79 is preferably constructed similar to the motor 41, having a conducting disk 81 fast to the motor shaft 82, the conducting disk being preferably made of aluminum to obtain a low inertia effect. This conducting disk 81 is arranged in the adjoining magnetic fields of the two separately energized alternating current coils 78 and 80.

The shaft 82 of the two phase motor 79 is connected by a pair of gears 83, 84 with a shaft 85 carrying a contact arm 86 traversing the resistance $R_A$. This shaft is also shown as carrying a pointer 87 which indicates the resistance on an adjacent scale 88.

To balance the bridge, the resistance $R_A$ must be adjusted so that no voltage appears between the mid points of the bridge, when $$R_x = R_A \frac{R_2}{R_1}$$

If an unbalance voltage does appear at the mid points of the bridge, its direction depends on whether the resistance $R_A$ is too large or too small. This voltage is impressed upon the rotating field 66 of the alternator 65, driven by the synchronous motor 75, and causes the alternator to generate a voltage whose phase depends on whether the resistance $R_A$ is too large or too small. This voltage is amplified by the amplifier 69 and is led to the winding 80 of the two phase motor 79. The other winding 78 is connected to the same alternating current supply lines 76 and 77 which supply current to the synchronous motor 75. As with the form of the invention shown in Fig. 1, the connections are made so that the motor 79 will run in a direction dependent upon the magnitude of the resistance $R_A$. By means of the gears 83 and 84, the motor 79 can rotate the shaft 85 on which is mounted the contact arm 86 and the pointer 87. The contact arm 86 is then moved on the variable resistance $R_A$ until this resistance $R_A$ is adjusted to the proper value, which is indicated by the pointer 87 on the scale 88.

It will be evident that a number of changes can be made in both forms of the invention without departing from the principles described. The direct current voltage caused by unbalance of the network can be used in other ways to produce an alternating current of reversible phase. The unbalance voltage can be connected to the stationary coils of the alternator, producing a stationary field structure. The rotating coil of the alternator then becomes the armature, and the slip rings are connected to the input of the amplifier. Or, the alternating current input to the amplifier can be generated by simply interrupting or modulating the unbalanced direct current voltage by mechanical or electronic means at a frequency corresponding to that of the supply voltage.

In place of driving the alternator by a synchronous motor, it may be driven by any source of mechanical power, whether of constant speed or not, provided a second small alternator is driven in synchronism with it. The output of the second alternator is then used to energize the coil of the two phase motor which is supplied with line current, this being the coil 42 in the form of the invention shown in Fig. 1 and the coil 78 in the form of the invention shown in Fig. 2.

The generator 18 and its control resistances 23 and 24 can, of course, be used as a current supply in any potentiometer circuit, regardless of the method of balancing the circuit. However, for very precise work, as in laboratory measurements, the generator 18 may be replaced by the conventional current supply battery and standard cell circuits. The automatic balancing arrangement, comprising alternator 16, amplifier 35, and motor 41 can be retained to facilitate rapid and accurate measurements.

From the foregoing it will be seen that the principles of the invention can be applied in a number of ways to produce the desired results, and the application of the invention is therefore not to be limited to the specific embodiments shown and described but is to be accorded the full range of equivalents comprehended by the accompanying claims.

I claim as my invention:

1. In an electrical network for balancing an unknown direct current voltage, means providing a source of unvarying direct current and comprising a direct current generator having a permanent magnet field, means for driving said generator at a constant speed, a relatively high resistance connected in series with said generator and regulating said direct current, a second resistance in series with said high resistance and said generator, said second resistance having an adjustable tapped portion, means for connecting said unknown direct current voltage in series opposition with the voltage drop across said adjustable tapped portion of said second resistance, means for generating an alternating current with the phase thereof dependent upon the direction of the unbalance between said voltages, means for amplifying said alternating current, and means actuated by said amplified alternating current for reducing said voltage unbalance.

2. In an electrical network for balancing an unknown direct current voltage, means providing a source of unvarying direct current and comprising a direct current generator having a permanent magnet field, means for driving said generator at a constant speed, a relatively high resistance connected in series with said generator and regulating said direct current, a second resistance in series with said high resistance and said generator, said second resistance having an adjustable tapped portion, means for connecting said unknown direct current voltage in series opposition with the voltage drop across said adjustable tapped portion of said second resistance, an alternator having a field, means for energizing said field in response to any voltage unbalance, a synchronous motor driving said alternator, means for amplifying the output of said alternator, and means actuated jointly by said amplified alternating current and the the voltage supply to said synchronous motor for reducing said voltage unbalance.

3. In an electrical network for balancing an unknown direct current voltage, means providing a source of unvarying direct current and comprising a direct current generator, means for driving said generator at a constant speed, a resistance in series with said generator, said resistance having an adjustable tapped portion, means for connecting said unknown direct current voltage in series opposition with the voltage drop across said adjustable tapped portion of said resistance, means for generating an alternating current with the phase thereof dependent upon the direction of the unbalance between said voltages, means for amplifying said alternating current, and means actuated by said amplified alternating current for adjusting the adjustable tapped portion of said resistance to reduce said voltage unbalance.

4. In an electrical network for balancing an unknown direct current voltage, means providing a source of unvarying direct current and comprising a direct current generator, means for driving said generator at a constant speed, a resistance in series with said generator, said resistance having an adjustable tapped portion, means for connecting said unknown direct current voltage in series opposition with the voltage drop across said adjustable tapped portion of said resistance, means for generating an alternating current with the phase thereof dependent upon the direction of the unbalance between said voltages and comprising a stationary winding and a movable winding, means for energizing one of said windings in response to voltage unbalance to produce an alternating current in the other winding with the phase thereof dependent upon the direction of the unbalance between said voltages, means for amplifying the output alternating current from the alternator, and means actuated by said amplified alternating current for reducing the voltage unbalance.

HENRY LEHDE.